(12) United States Patent
Takahashi et al.

(10) Patent No.: US 6,709,159 B2
(45) Date of Patent: Mar. 23, 2004

(54) BEARING STRUCTURE

(75) Inventors: Masashi Takahashi, Saitama (JP); Tomoaki Kobayashi, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/269,853

(22) Filed: Oct. 15, 2002

(65) Prior Publication Data

US 2003/0081870 A1 May 1, 2003

(30) Foreign Application Priority Data

Oct. 25, 2001 (JP) ........................................ 2001-327975

(51) Int. Cl.⁷ .............................................. F16C 17/02
(52) U.S. Cl. ....................................................... 384/275
(58) Field of Search ................................. 384/275, 441, 384/440, 129, 296

(56) References Cited

U.S. PATENT DOCUMENTS 5,357,868 A * 10/1994 Maas .......................... 384/275
6,487,025 B2 * 11/2002 Koiwai et al. .............. 359/699

\* cited by examiner

*Primary Examiner*—Lenard A. Footland
(74) *Attorney, Agent, or Firm*—Greenblum & Bernstein, P.L.C.

(57) ABSTRACT

A bearing structure comprises a rotational shaft and a bearing member. The rotational shaft has a pair of flanges, and a small diameter portion provided between the flanges. The flanges have first tapered surfaces. The first tapered surfaces taper down to the diameter of the small diameter portion as the first tapered surfaces approach the small diameter portion. The bearing member has a support groove to support the small diameter portion, and second tapered surfaces formed between the support groove and restraining surfaces connected by the support groove. The small diameter portion is fit in the support groove while the first tapered surfaces are engaged with the second tapered surfaces. A flank is formed on at least one part of the flanges that face each other and at substantially the same circumferential position on the flanges, to form a gap with one of the second tapered surfaces.

10 Claims, 5 Drawing Sheets

BEARING STRUCTURE

BACKGROUND OF THE INVENTION

1. Field of the Invention

The present invention relates to a bearing structure containing a gear shaft and so on, used for a focusing mechanism of a camera, for example.

2. Description of the Related Art

Conventionally, a gear mechanism provided in a focusing mechanism has a gear shaft, made of plastic material, and a bearing member having a U-shaped groove to support the gear shaft. The gear shaft has a pair of flanges and a small diameter portion formed between the flanges. The small diameter portion is rotatably supported by the groove, and the flanges are in slidable contact with the end surfaces of the bearing member. Thus, the gear shaft is rotated about the axis thereof, while axial movement of the gear shaft is prevented by the flanges.

The gear shaft is manufactured using molds, and thus, a parting line is formed on a surface of the gear shaft, because of a dividing portion of the molds. The parting line extends in the axial direction of the gear shaft, along the surfaces of the flanges and the small diameter portion, and a flash or an unwanted projection may remain on the parting line. The flash interferes with the groove or the end surfaces, and may prevent the gear shaft from rotating smoothly. Thus, the flash may be removed during the manufacturing process so as to ensure the smooth rotation of the gear shaft. However, the removing process increases the cost of the gear shaft, and is troublesome.

Instead of removing the flash, a plane may be formed beforehand on a portion of the gear shaft, through which the parting line passes. The depth of the plane must be greater than the size of a flash which might occur, so that the flash is prevented from coming into contact with the groove or the end surfaces. However, because of the recess, a step is formed on the gear shaft, and this step may interfere with an edge between the groove and the end surface, so that the problem regarding the smooth rotation may not be fully resolved.

SUMMARY OF THE INVENTION

Therefore, an object of the present invention is to provide a bearing structure, which enables a smooth rotation of a gear shaft, and which is simple and obtained without increasing the cost.

According to the present invention, there is provided a bearing structure comprising a rotational shaft and a bearing member.

The rotational shaft has a pair of flanges located at axially different positions, and a small diameter portion provided between the pair of flanges. The small diameter portion has a diameter smaller than diameters of the flanges. The flanges have end surfaces facing each other, on which first tapered surfaces are formed. The first tapered surfaces taper down to the diameter of the small diameter portion as the first tapered surfaces approach the small diameter portion. The bearing member has a pair of restraining surfaces, a support groove formed between the pair of restraining surfaces to support the small diameter portion, and second tapered surfaces formed between the support groove and the restraining surfaces. The small diameter portion is fit in the support groove while the first tapered surfaces are engaged with the second tapered surfaces. A flank is formed on at least one part of the flanges that face each other and at substantially the same circumferential position on those flanges, to form a gap with one of the second tapered surfaces.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
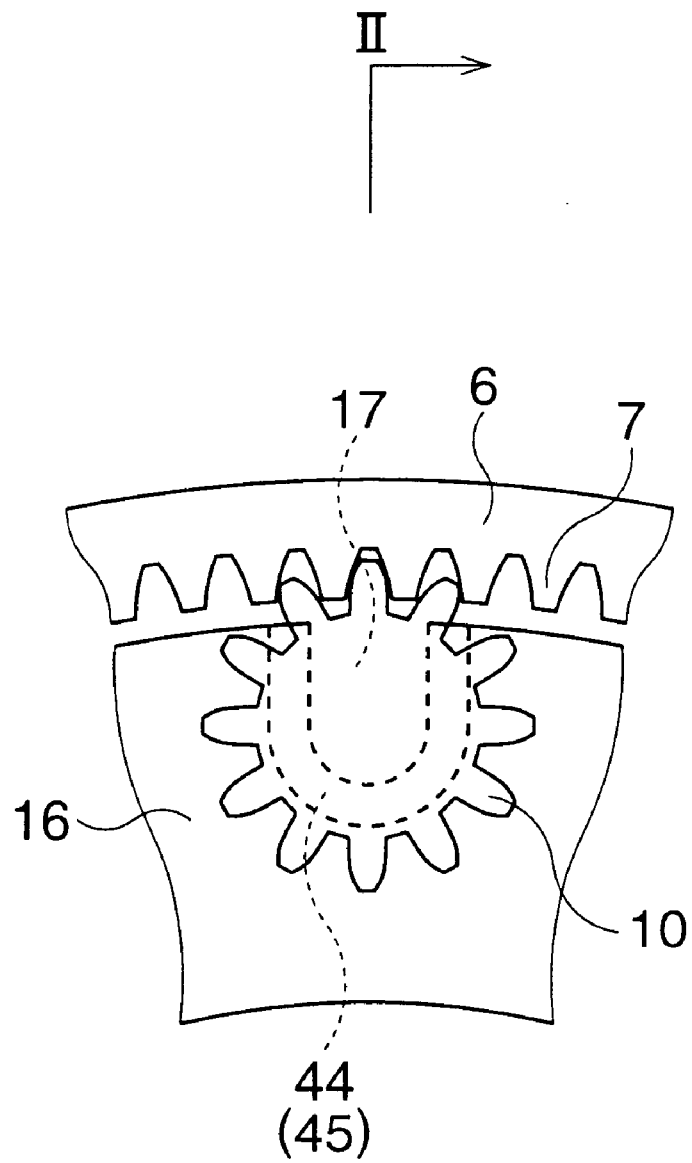
FIG. 1 is a front view showing an embodiment of a bearing structure, which is applied to a gear supporting mechanism provided to a focusing mechanism of a camera.
Figure 2:
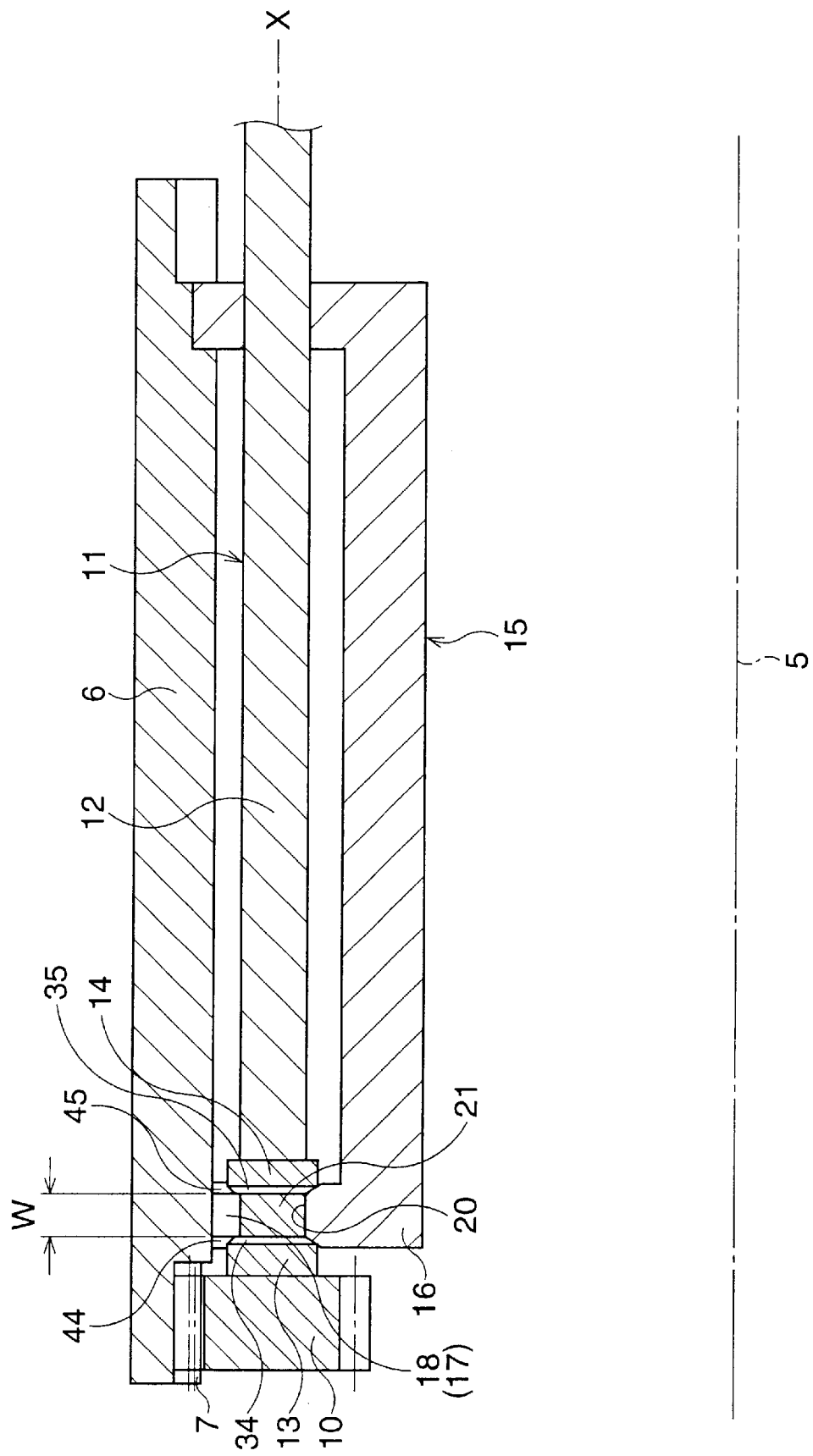
FIG. 2 is a sectional view of the bearing structure along II—II line of FIG. 1.

The present invention will be described below with reference to the embodiments shown in the drawings.

FIGS. 1 through 5 show an embodiment of the present invention. The embodiment is a bearing structure of a gear shaft, which is provided in a focusing mechanism housed in a lens barrel of a camera.

The focusing mechanism contains a focusing cylinder 6, which has the center axis coincident with the optical axis 5 of the lens system. The focusing cylinder 6 is rotated about the optical axis 5 to change a focusing point of the lens system. A focusing gear 7 is formed on an inner surface of the focusing cylinder 6, and a shaft gear 10 meshes with the focusing gear 7. The shaft gear 10 is fixed to an end portion of a gear shaft (i.e., a rotational shaft) 11, and another end portion of the gear shaft 11 is connected to a focusing drive system (not shown). The focusing drive system can rotate the gear shaft 11 in a forward direction and a reversed direction. The rotation of the gear shaft 11 is transmitted to the focusing cylinder 6 through the shaft gear 10.

The gear shaft 11 has a shaft body 12 and a pair of flanges 13 and 14, which are located at axially different positions on the gear shaft 11. A small diameter portion 21 is formed between the pair of flanges 13 and 14. The small diameter portion 21 has a diameter smaller than the diameters of the flanges 13 and 14.

A bearing member 15 is provided with a vertical wall 16 perpendicular to the other part of the bearing member 15. A U-shaped groove (or a support groove) 17 is formed on the vertical wall 16, and the small diameter portion 21 is rotatably and slidably supported by the U-shaped groove 17.

Figure 5:
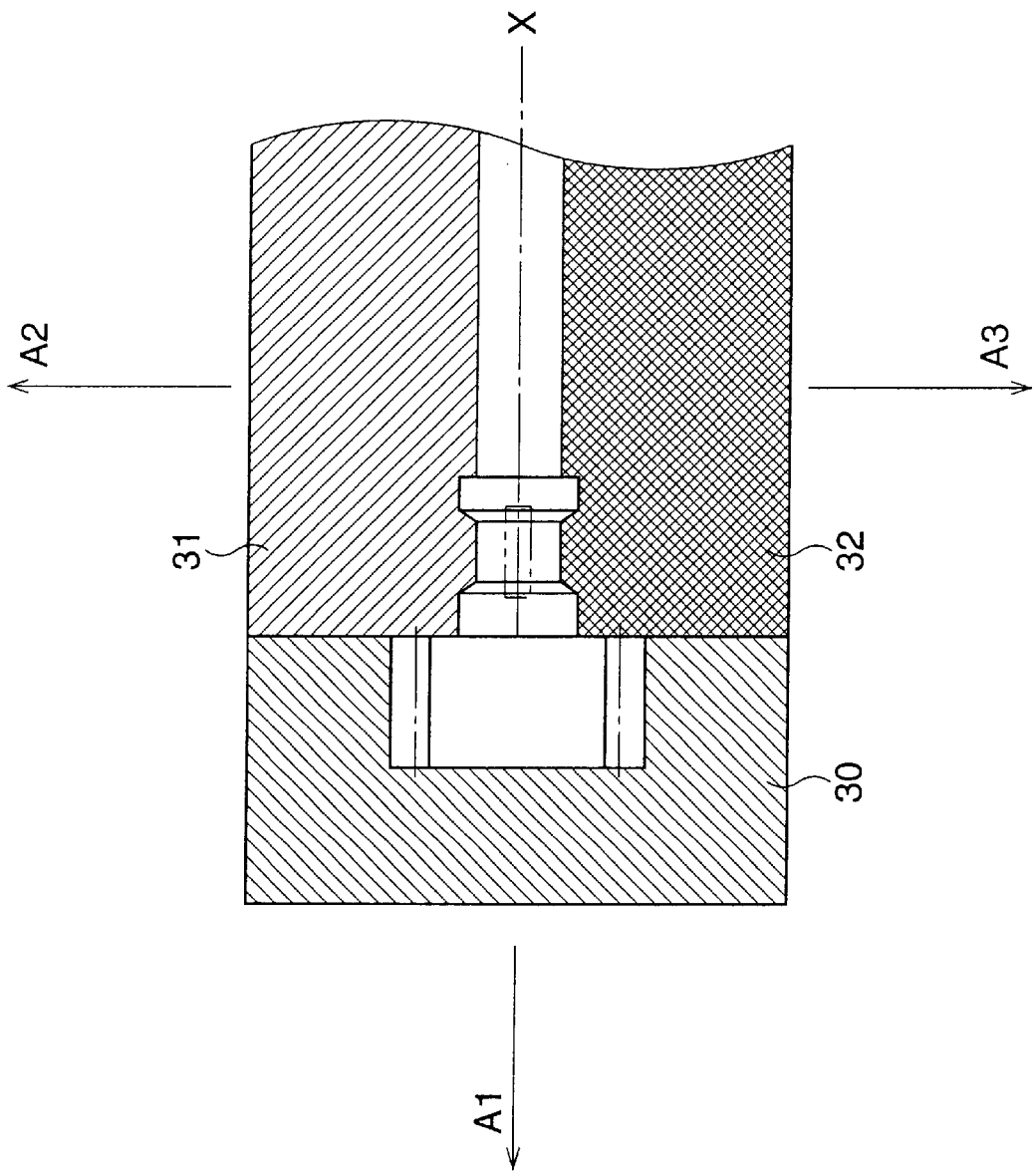
FIG. 5 is a sectional view showing molds for manufacturing a shaft gear and a gear shaft.

The shaft gear 10 and the gear shaft 11 are made of plastic material, and are manufactured as one body by injection molding. FIG. 5 shows a sectional view of an example of a set of molds for manufacturing the shaft gear 10 and the gear shaft 11. The molds include a first mold 30 for forming the shaft gear 10, and second and third molds 31 and 32 for forming the gear shaft 11.

Figure 3:
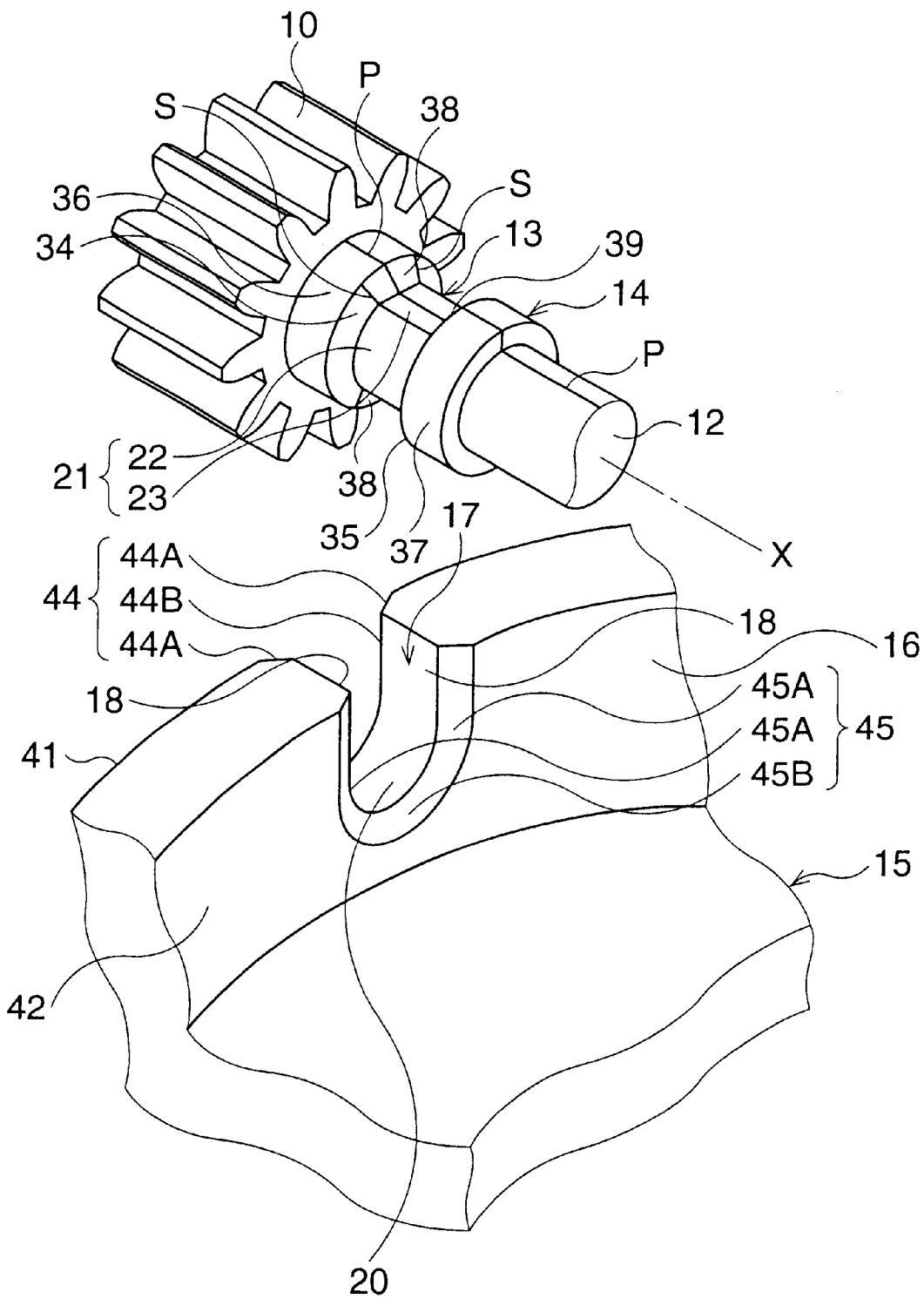
FIG. 3 is a perspective view showing a main part of the bearing structure in a disassembled state.
Figure 4:
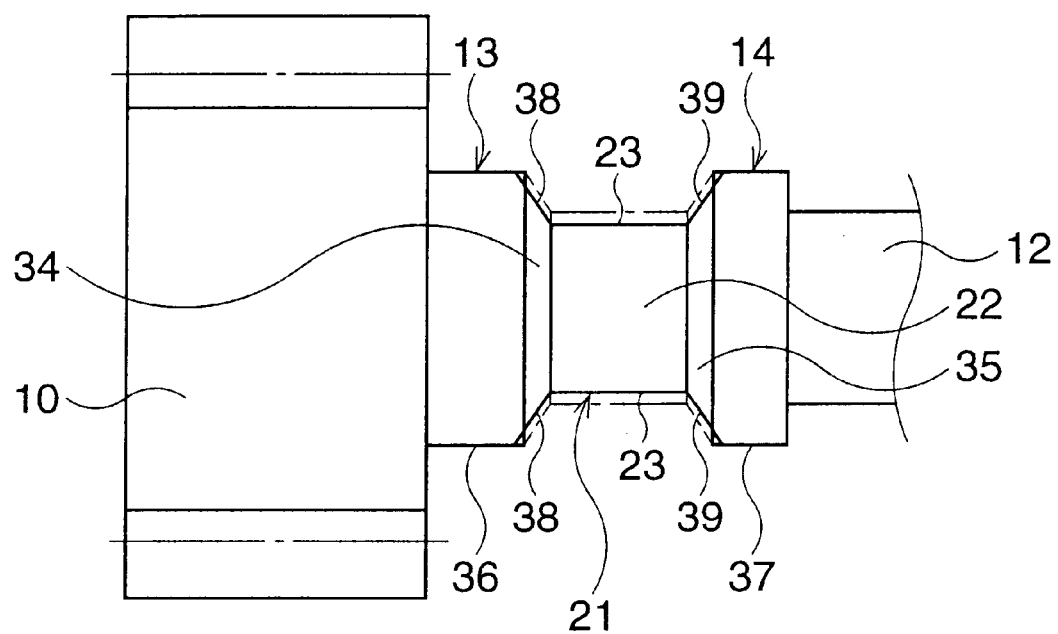
FIG. 4 is a side view showing the main part.

Since the shaft gear 10 has a section shape, which is uniform along the axial direction of the gear shaft 11, the first mold 30 can be drawn (pulled) out in the axial direction A1 of the gear shaft 11, after the formation process. Conversely, since the gear shaft 11 has the flanges 13 and 14 which are located at axially different positions, the second and third molds 31 and 32 are drawn out in a direction A2 or A3 perpendicular to the axis X of the gear shaft 11. Thus, a parting line P (see FIG. 3) extending along the axis X is formed on an outer surface of the gear shaft 11. Although only one parting line P is indicated in FIG. 3, in reality, another parting line is formed on the opposite side with respect to the axis X.

As is well known, if the parting line remains on the gear shaft 11, the parting line interferes with the bearing member 15, so that a smooth rotation of the gear shaft 11 may not be ensured. In this embodiment, a flat surface 23 is formed on the small diameter portion 21 of the gear shaft 11, so that a flash remaining on the parting line P does not come into contact with an inner surface of the U-shaped groove 17. The flat surface 23 is positioned closer to the axis X in comparison with an outer cylindrical surface 22 of the small diameter portion 21, to form a gap with the U-shaped groove 17. The flat surface 23 is formed on each side of the small diameter portion 21. This is to say that the flat surfaces 23 are positioned opposite to each other with respect to the axis of the gear shaft 11.

On the other hand, for removing the effects of the parting line P passing through the flanges 13 and 14, the following construction is provided.

Namely, first tapered surfaces 34 and 35 are formed on end surfaces of the flanges 13 and 14, which face each other. The first tapered surfaces 34 and 35 are conical surfaces, the center axes of which are coincident with the axis X. The first tapered surfaces 34 and 35 taper down to the diameter of the small diameter portion 21 as the first tapered surfaces 34 and 35 approach the small diameter portion 21. Thus, the first tapered surfaces 34 and 35 smoothly connect the outer cylindrical surface 22 of the small diameter portion 21 to the outer cylindrical surfaces 36 and 37 of the flanges 13 and 14. Flanks 38 and 39 are formed on the parts of the flanges 13 and 14 that face each other and at the same circumferential position on those flanges 13 and 14. The flanks 38 and 39 are formed at angular positions corresponding to the parting line P to connect to the flat surface 23.

The flanks 38 and 39 are flat planes positioned closer to the axis X in comparison with the first tapered surfaces 34 and 35, to form gaps with the second tapered surfaces 44B and 45B described later. The flat plane of each of the flanks 38 and 39 is sandwiched by two generatrices (boundary lines S) of the conical surface, which are contained on the first tapered surface 34 or 35 and located at opposite positions with respect to the parting line P. Thus, the flanks 38 and 39 are smoothly connected to the first tapered surfaces 34 and 35 at the boundary lines S. In other words, an angle, formed between each of the first tapered surfaces 34 and 35 and each of the flanks 38 and 39, becomes smaller in comparison with a conventional device, in which a step is formed on the gear shaft. Note that, in FIG. 4, outlines of the flat surfaces 23, and the flanks 38 and 39 are indicated by solid lines, while outlines of the gear shaft 11, in which it is supposed that the flanks are not provided, are indicated by chain doubled-dashed lines.

The U-shaped groove 17 formed in the vertical wall 16 has a pair of guide surfaces 18, and a semicircular bottom 20 connected to the guide surfaces 18. The guide surfaces 18 are parallel to each other, and correspond to an outer diameter of the outer cylindrical surface 22. The semicircular bottom 20 corresponds to an outer surface of the outer cylindrical surface 22. The opposite portion of the U-shaped groove 17 to the semicircular bottom 20 is open, so that the small diameter portion 21 of the gear shaft 11 is inserted and disassembled in a direction perpendicular to the axis X. The breadths of the guide surfaces 18 and the semicircular bottom 20 are coincident with the length of the outer cylindrical surface 22 of the small diameter portion 21, as indicated by reference W in FIG. 2.

The vertical wall 16 has a front restraining surface 41 and a rear restraining surface 42. The U-shaped groove 17 is formed between the front and rear restraining surfaces 41 and 42.

A first bearing surface 44 is formed between the front restraining surface 41 and the U-shaped groove 17, and has an inclination angle corresponding to the first tapered surface 34 of the flange 13. A second bearing surface 45 is formed between the rear restraining surface 42 and the U-shaped groove 17, and has an inclination angle corresponding to the first tapered surface 35.

The bearing surfaces 44 and 45 have second tapered surfaces 44B and 45B, and third tapered surfaces 44A and 45A connected to the second tapered surfaces 44B and 45B. The second tapered surfaces 44B and 45B are formed between the semicircular bottom 20 of the U-shaped groove 17 and the restraining surfaces 41 and 42. The second tapered surfaces 44B and 45B have semi-concave-frustums that are obtained by cutting a frustum along a plane passing through the axis thereof, and the diameter gradually becomes larger towards outer walls of the bearing member 15. The third tapered surfaces 44A and 45A are flat, and the opening breadth gradually becomes larger towards the outer walls of the bearing member 15. The second tapered surfaces 44B and 45B, and the third tapered surfaces 44A and 45A have shapes corresponding to the first tapered surfaces 34 and 35 of the flanges 13 and 14.

When the gear shaft 11 is assembled on the bearing member 15, the small diameter portion 21 is inserted from the opening of the U-shaped groove 17 into the semicircular bottom 20 while the first tapered surface 34 of the flange 13 is slidably engaged with the first bearing surface 44 and the first tapered surface 35 of the flange 14 is slidably engaged with the second bearing surface 45. Thus, the small diameter portion 21 is guided by the guide surfaces 18, and the first tapered surfaces 34 and 35 of the flanges 13 and 14 are guided by the third tapered surfaces 44A and 45A, so that the gear shaft 11 is inserted until the outer cylindrical surface 22 of the small diameter portion 21 abuts against the semicircular bottom 20.

When the outer cylindrical surface 22 comes into contact with the semicircular bottom 20, the first tapered surface 34 comes into contact with the second tapered surface 44B of the first bearing surface 44, and the first tapered surface 35 comes into contact with the second tapered surface 45B of the second bearing surface 45. Thus, the small diameter portion 21 is fit in the U-shaped groove 17 while the first tapered surfaces 34 and 35 are engaged with the second tapered surfaces 44B and 45B. In other words, the flanges 13 and 14 are not supported by the front restraining surface 41 and the rear restraining surface 42, but are supported by the tapered surfaces 44B and 45B.

The three contact portions between the gear shaft 11 and the bearing member 15 include a cylindrical surface (contact between the semicircular bottom 20 and the outer cylindrical surface 22) which has the axis X of the gear shaft 11, and the conical surfaces (contact between the first tapered surface 34 and the second tapered surface 44B, and contact between the first tapered surface 35 and the second tapered surface 45B). Accordingly, the gear shaft 11 is rotatably supported about the axis X. Further, regarding the flanges 13 and 14 of the gear shaft 11, the frustum conical surfaces of the first tapered surfaces 34 and 35, facing each other, are set in contact with the frustum conical surfaces of the second tapered surfaces 44B and 45B of the bearing member 15. Therefore, the axial movement of the gear shaft 11 relative to the bearing member 15 is restrained. Thus, when the focusing drive system is driven, the shaft gear 10, which is integral with the gear shaft 11, is rotated about the axis X without moving along the axis X.

In the bearing structure described above, having the three contact portions between the gear shaft 11 and the bearing member 15, a flash remaining on the parting line P passing through the small diameter portion 21 is prevented from coming into contact with the U-shaped groove 17 (or the semicircular bottom 20), by positioning the parting line P on the flat surface 23. Further, in the two contact portions corresponding to the flanges 13 and 14, the parting line P passes through the flanks 38 and 39, which are located closer to the axis X in comparison with the first tapered surfaces 34 and 35, with which the first bearing surface 44 and the second bearing surface 45 are engaged. Accordingly, a flash remaining on the parting line P is prevented from coming into contact with the first bearing surface 44 and the second bearing surface 45 (or the second tapered surfaces 44B and 45B).

Further, the angular differences at the boundary lines S, which are formed between the flanks 38 and 39 and the first tapered surfaces 34 and 35 which are in contact with the bearing member 15, are much smaller than in a conventional device, in which a right angle portion is formed between a recess and a tapered surface. Therefore, the boundary lines S do not interfere with the bearing member 15. Furthermore, in the bearing member 15, the flanges 13 and 14 are supported by conical surfaces, such as the second tapered surfaces 44B and 45B, which do not contain a right angle portion, so that the bearing member 15 cannot interfere with the gear shaft 11.

Still further, in the bearing structure of the embodiment, the flanges 13 and 14, engaged with the bearing member 15 through the conical tapered surfaces, do not only restrain the axial displacement of the gear shaft 11, but also function to guide the rotation of the gear shaft 11 together with the small diameter portion 21.

As described above, according to the embodiment, because of the flanks 38 and 39, a flash generated in the formation process is prevented from interfering with the rotation, so a smooth rotation of the rotational shaft is ensured.

Note that, although the first tapered surfaces 34 and 35 are symmetrical with respect to a flat plane perpendicular to the axis X, the inclination angles of the tapered surfaces 34 and 35 may be different. In this case, the inclination angles of the first bearing surface 44 and the second bearing surface 45 of the bearing member 15 are changed in accordance with the angle of the first tapered surfaces 34 and 35. Further, the shapes and the sizes of the flanks 38 and 39 can be changed depending on what is required.

Furthermore, the bearing structure of the present invention is not limited to a focusing drive system, and can be applied to various kinds of devices.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-327975 (filed on Oct. 25, 2001) which is expressly incorporated herein, by reference, in its entirety.

What is claimed is:

1. A bearing structure comprising:

a rotational shaft that has a pair of flanges located at axially different positions, and a small diameter portion provided between said pair of flanges, said small diameter portion having a diameter smaller than the diameters of said flanges, said flanges having end surfaces facing each other, on which first tapered surfaces are formed, said first tapered surfaces tapering down to the diameter of said small diameter portion as said first tapered surfaces approach said small diameter portion; and a bearing member that has a pair of restraining surfaces, a support groove formed between said pair of restraining surfaces to support said small diameter portion, and second tapered surfaces formed between said support groove and said restraining surfaces, said small diameter portion being fit in said support groove while said first tapered surfaces are engaged with said second tapered surfaces;

wherein a flank is formed on at least one part of said flanges that face each other and at substantially the same circumferential position on said flanges, to form a gap with one of said second tapered surfaces.

2. A bearing structure according to claim 1, wherein said rotational shaft is manufactured using molds, by which a parting line, extending in the axial direction, is formed, said parting line passing through said flank.

3. A bearing structure according to claim 1, wherein each of said flanks has a flat plane sandwiched by two generatrices, which are contained on said first tapered surface.

4. A bearing structure according to claim 1, wherein two flanks are formed on two parts of said flanges that face each other, at substantially the same circumferential position on said flanges, and at positions opposite to each other with respect to the axis of said rotational shaft.

5. A bearing structure according to claim 1, wherein said bearing member has third tapered surfaces connected to said second tapered surfaces, said rotational shaft being guided by said third tapered surfaces when said rotational shaft is assembled in said support groove.

6. A bearing structure according to claim 1, wherein said rotational shaft has a flat surface formed on said small diameter portion, said flat surface being located at the same angular position as said flank, and forming a gap with said support groove.

7. A bearing structure according to claim 6, wherein said flat surface is formed on each side of said small diameter portion, each side being positioned opposite to each other with respect to the axis of said rotational shaft.

8. A bearing structure according to claim 6, wherein said rotational shaft is manufactured using molds, by which a parting line, extending in the axial direction, is formed, said parting line passing through said flat surface.

9. A bearing structure according to claim 1, wherein said rotational shaft is a gear shaft having a gear on an end portion thereof.

10. A bearing structure according to claim 9, wherein said gear shaft is provided in a focusing mechanism housed in a lens barrel of a camera.

* * * * *